UNITED STATES PATENT OFFICE.

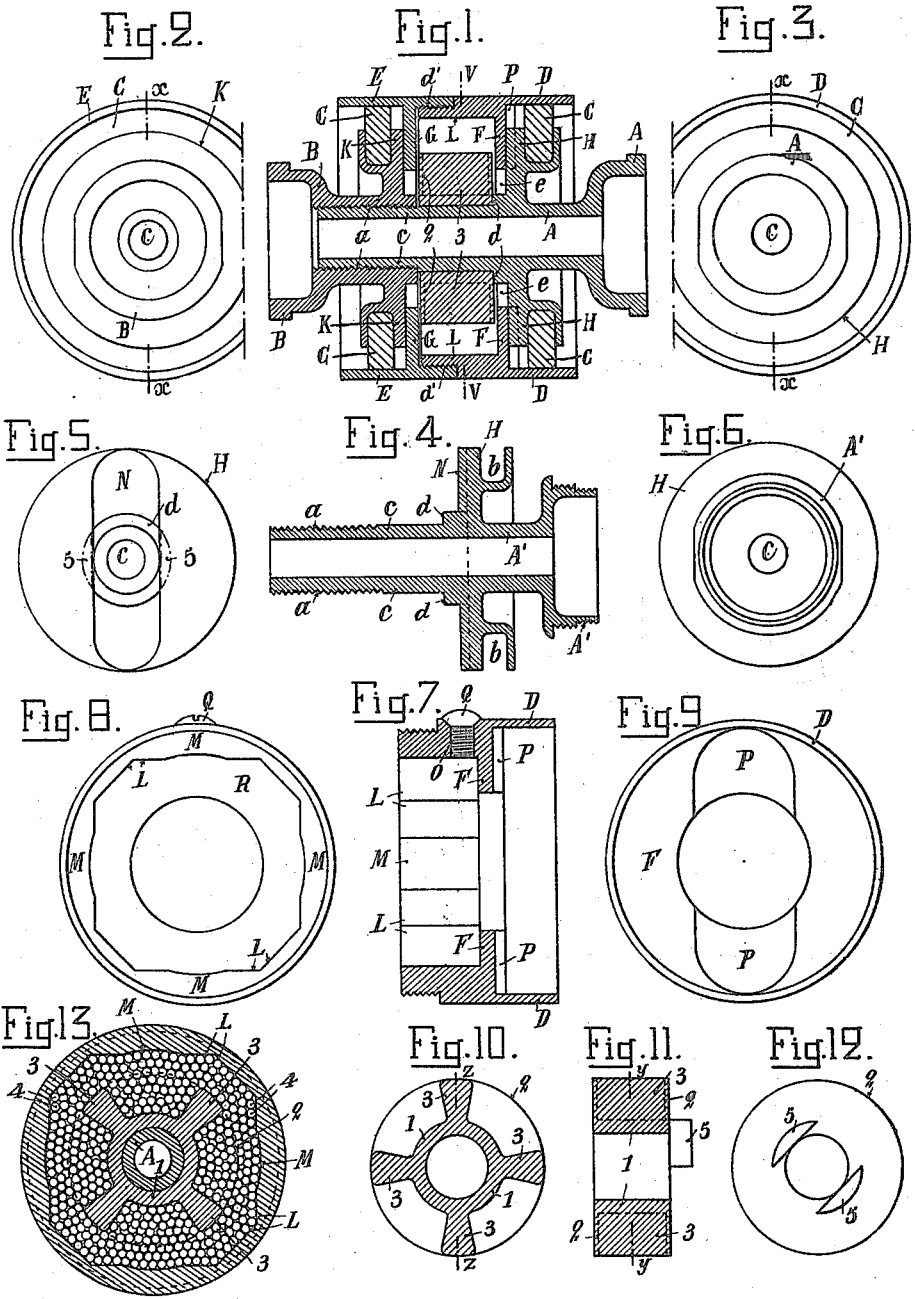

CHARLES EDOUARD MOSER, OF BOULOGNE-SUR-SEINE, FRANCE.

VEHICLE-WHEEL.

1,208,192.  Specification of Letters Patent.  Patented Dec. 12, 1916.

Application filed November 25, 1912. Serial No. 733,391.

*To all whom it may concern:*

Be it known that I, CHARLES EDOUARD MOSER, a citizen of the French Republic, residing at 14 Rue Thiers, Boulogne-sur-Seine, Seine, France, have invented certain new and useful Improvements in Vehicle-Wheels, of which the following is a specification.

This invention relates to shock deadening wheels comprising an annular chamber entirely filled with balls, provided with non-circular peripheral sides, in which a hub with radial ribs rotates, the ribs being sunk in the mass of balls. It is intended to effect a constructional improvement of this kind of wheel which is characterized by the addition of a resilient cushion introduced between the ring firmly connected with the rim and the radial plates serving as guides to the chamber. This resilient cushion is intended to insure a better mode of suspension of the hub by the mass of balls by reason of the fact that the hub if moved into a position eccentric in relation to the rim, is immediately centered afresh by the expansion of the cushion, which renders the deadening of the shocks more gentle. This construction is moreover characterized by the arrangement on the inner face of the circular plate which is rigidly connected with the hub proper of a wide diametrical rib which is engaged with a wider recess formed in the outer face of one of the walls of the ball chamber against which said plate abuts. The recess in this plate is wider than the rib to provide for the slight shifting of the ball chamber during the rotation in one direction or the other of the rim on which the chamber is fixed.

The improved construction is illustrated in the accompanying drawing.

Figure 1 is a vertical section of the assembled devices taken through the line $x$ $x$ of a front wheel of a bicycle equipped with this invention. Figs. 2 and 3 comprise respectively end elevations of opposite ends of the wheel hub and the parts mounted thereon as shown in Fig. 1; Fig. 4 is a detached view in vertical section of the axle sleeve used in connection with the back or the driving wheel; Figs. 5 and 6 are respectively end views taken from opposite ends of this sleeve. Fig. 7 is a detached view in vertical section of one of the members of the external wall of the ball-chamber. Figs. 8 and 9 are respectively left and right side views of this member. Fig. 10 is a vertical section taken on the line $y$—$y$ of Fig. 11 showing the hub with radial ribs; Fig. 11 is a vertical section taken at right angles to Fig. 10 on the line $z$—$z$ of Fig. 10; Fig. 12 is an end view of the right side of Fig. 11. Fig. 13 is a vertical section through $v$ $v$ in Fig. 1 showing the ball casing and the hub with radial ribs.

On the axle, the sleeve A or sleeve $A^1$ is mounted. These sleeves are screw-threaded at $a$ over a portion of their length. On to this screw-threaded part the second sleeve B is screwed. These sleeves A and B constitute the hub proper of the shock deadening wheel. Each of these sleeves is provided with an annular flange formed with a peripheral groove $b$ in which resilient elements C are placed and which are here shown in the form of rubber rings. The elastic rings C are intended to assist the mass of balls to resume its normal central position in the chamber after being displaced. The mass of balls moves at the moment when the rim meets with an obstacle in the road and then resumes its place assisting the axle journal to return to its normal centering position.

The sleeve A or $A^1$ has in the middle and over a portion of its length a cylindrical part $c$, upon which is mounted the ribbed hub 1 forming the part of the ball chamber supporting the mass of balls. When the sleeves A and B are in position, the hub 1 is held tightly between the shoulders $d$ of the sleeves A and B. This hub comprises circular lateral cheeks 2 and radial arms or ribs 3 running from the hub 1 and terminating at the level of the periphery of the cheeks 2. These ribs extend from the hub toward the periphery of the cheeks 2.

The peripheral cylindrical wall of the ball chamber is formed by two cylindrical members D and E. The member D is provided with a screw threaded part $d^1$ on to which the screw-threaded part of the other member E is screwed. Each member D or E is provided with a radial internal cheek or flange F or G which comes between the cheeks 2 of the hub 1 and the flange H or K of the sleeve A or B. The internal wall L of the member D is polygonal and has curvilinear parts M in the middle of the flat surfaces L.

The flange H is furnished diametrically on one portion of its length with a rib N and the adjacent radial cheek or flange F is furnished diametrically over a portion of its width with an opening P which is wider. These ribs and openings N and P enable the peripheral casing D, E to move slightly during the rotation of the rim of the wheel in one direction or the other. A screw hole O is formed in the casing D for the purpose of introducing the balls into the chamber. When the balls have been introduced this hole is closed by a plug Q.

The hub 1 with radial ribs 3 occupies the position shown in Fig. 13, so that the balls 4 are lodged between the ribs 3 and above them in the polygonal chamber R. This hub 1 moves radially during the rotation of the wheel over rough or uneven ground between the radial cheeks F and G, moving and carrying along the balls 4 which fill the chamber R. These balls change place without abruptness and distribute the shocks received by the hub. The result is a gentle deadening of these shocks as the mass of balls is constantly displaced and returns slowly to occupy the centering position. One of the cheeks 2 of the hub 1 is provided on its outer face with two segmental projections 5 (Figs. 11 and 12) of the same height as the shoulder $d$ and of the rib N. These projections as shown in dotted lines Fig. 5, engage the shoulders $d$ which are cut away at this point, and the curved faces of said projections 5 operate to compel the hub to turn with the members A and B.

What I claim and desire to secure by Letters Patent is:—

1. In a shock absorbing wheel the combination of an annular chamber having a polygonal peripheral inner wall, non-compressible balls filling said chamber, a hub composed of two telescopically engaged members threaded into each other, each member being provided with a radial plate on one face provided near its circumference with a groove substantially rectangular in cross section, a cylindrical annular hub box mounted on said hub and having interlocking engagement with the radial plates of the hub forming a portion of the ball chamber, said hub box being provided with annular end closures and having peripheral openings, radial arms dividing the interior of said box into four equal compartments, an envelop inclosing the ball chamber and arranged concentric with the hub, said envelop being formed of two longitudinally disposed adjustably connected tubular members having polygonal inner faces and provided with two inwardly extending radial plates engaged respectively with the inner faces of the radial hub carried plates, forming the annular ball chamber having a polygonal inner peripheral wall, two rubber rings placed in the grooves of the radial hub plates and extending between the bottoms of these grooves and the inner faces of the tubular members comprising the envelop.

2. In a shock absorbing wheel, an annular polygonal chamber filled with non-compressible balls, a hub composed of two members, each provided with a circular radial plate equipped on its outer face with a groove rectangular in cross section, a rubber ring disposed in each of said grooves, one of said radial plates being provided on its inner face with a diametrically disposed rib of a width equal to the diameter of the hub, a hub box having radial arms dividing it into compartments and in which the balls are disposed, one of the walls of said hub box being provided on its exterior face with two symmetrical segmental projections, the rectangular faces of which are tangential to the perforation of the hub box, said projections being disposed at each side of the rib of the radial hub plate, an envelop formed of two tubular members arranged longitudinally and screwed together, each of said members being provided with a radially and inwardly extending plate constituting the end walls of the ball chamber, one of said radial plates being provided on its outer face with a recess wider than the rib of the radial hub plate and in which said rib is disposed to permit the envelop to shift slightly during the rotation of the wheel in one direction or the other, two rubber rings disposed in the grooves of said radial hub plates and extending from the bottom of said grooves to the inner face of the envelop, said rubber rings being slightly compressible to modify the shock of the shifting of the non-compressible balls in the chamber.

In testimony whereof I affix my signature, in presence of two witnesses.

CHARLES EDOUARD MOSER.

Witnesses:
ALBERT MAULVAULT,
HANSON C. COXE.